United States Patent [19]

Yamamoto et al.

[11] Patent Number: 5,344,881
[45] Date of Patent: Sep. 6, 1994

[54] RUBBER COMPOSITIONS AND VULCANIZED RUBBER COMPOSITIONS

[75] Inventors: Keisaku Yamamoto; Yoshio Tanimoto; Masahiro Fukuyama; Noriyasu Yasuda, all of Chiba, Japan

[73] Assignee: Sumitomo Chemical Company, Limited, Osaka, Japan

[21] Appl. No.: 77,456

[22] Filed: Jun. 17, 1993

Related U.S. Application Data

[63] Continuation-in-part of Ser. No. 962,540, Oct. 19, 1992, abandoned.

[30] Foreign Application Priority Data

Nov. 21, 1991 [JP] Japan .................................. 3-306162
Jul. 13, 1992 [JP] Japan .................................. 4-184997

[51] Int. Cl.$^5$ ...................... C08L 23/08; C08L 63/02; C08L 71/03; C08L 33/08; C08L 33/10; C08L 33/14
[52] U.S. Cl. ..................... 525/112; 525/117; 525/118; 525/120; 525/187
[58] Field of Search ............. 525/112, 117, 120, 187, 525/118

[56] References Cited

U.S. PATENT DOCUMENTS

4,032,479 6/1977 Bunnomori et al. ................ 525/404
4,511,698 4/1985 Matoba et al. ..................... 525/187

FOREIGN PATENT DOCUMENTS

59-129255 7/1984 Japan .
59-133244 7/1984 Japan .

OTHER PUBLICATIONS

Chemical Abstracts, vol. 111 No. 8, 1989, Columbus, Ohio, US: abstract No. 59392T, A. Maeda et al. "Mixtures of Acrylic Rubbers and Epichlorohydrin-Propylen Oxide Rubbers".

*Primary Examiner*—John C. Bleutge
*Assistant Examiner*—Donald R. Wilson
*Attorney, Agent, or Firm*—Cushman, Darby & Cushman

[57] ABSTRACT

A rubber composition which is vulcanizable with organic peroxides and provides vulcanized rubber excellent in oil resistance, heat resistance, low-temperature resistance and compression set. The composition comprises 30 to 95 parts by weight of the following component (A) and 70 to 5 parts by weight of the following component (B) (wherein component (A)+component (B)=100 parts by weight) as well as 1 to 10 parts by weight of the following component (C) per 100 parts by weight of the total amount of the components (A) and (B):

component (A): an ethylene-acrylate or ethylene-methacrylate copolymer rubber wherein the amount ratio in mole of ethylene and acrylate or methacrylate is in the range from 50:50 to 85:15, component (B): an epichlorohydrin rubber which is vulcanizable with an organic peroxide and has unsaturated carbon-carbon double bonds as a vulcanizable group in the amount of 1 to 15 mole % in the rubber, and component (C): a multifunctional epoxy compound of a weight-average molecular weight in the range of 100 to 15,000 and of an epoxy equivalent in the range of 10 to 10,000 containing an epoxy ring.

21 Claims, No Drawings

RUBBER COMPOSITIONS AND VULCANIZED RUBBER COMPOSITIONS

This is a continuation-in-part application of Ser. No. 07/962540 filed Oct. 19, 1992 which is abandoned.

The present invention relates to a rubber composition vulcanizable with an organic peroxide and a vulcanized rubber composition. More particularly, the present invention provides a vulcanized rubber composition vulcanized with an organic peroxide which comprises as primary components an ethylene-acrylate or ethylene-methacrylate copolymer rubber and an epichlorohydrin rubber and is excellent in properties such as oil resistance, heat resistance, low-temperature resistance and compression set.

Acrylic rubbers are known as elastomers which exhibit oil resistance. Ethylene-acrylate copolymers are known as elastomers excellent in the balance of oil resistance, heat resistance and low-temperature resistance. In addition, a technology for improving oil resistance by the use of a blend with an acrylic rubber with an ethylene-acrylate copolymer is known (Japanese KOKAI No. 92251/1989). Furthermore, the requisitions for the properties such as oil resistance, heat resistance and low-temperature resistance as well as compression set have been recently heightened too much to be satisfied.

It is an object of the present invention to provide a rubber composition vulcanizable with an organic peroxide which gives vulcanized rubber excellent in properties such as oil resistance, heat resistance, low-temperature resistance and compression set.

According to the present invention, a rubber composition is provided which comprises 30 to 95 parts by weight of the following component (A) and 70 to 5 parts by weight of the following component (B) (wherein component (A)+component (B)=100 parts by weight) as well as 1 to 10 parts by weight of the following component (C) per 100 parts by weight of the total amount of the components (A) and (B):

component (A): an ethylene-acrylate or ethylene-methacrylate copolymer rubber wherein the amount ratio in mole of ethylene and acrylate or methacrylate is in the range from 50:50 to 85:15 component (B): an epichlorohydrin rubber which is vulcanizable with an organic peroxide and has unsaturated carbon-carbon double bonds as a vulcanizable group in the amount of 1 to 15 mole % in the rubber, and component (C): a multifunctional epoxy compound of a weight-average molecular weight in the range of 100 to 15,000 and an epoxy equivalent weight in the range of 100 to 10,000 containing an epoxy ring.

The present invention also provides a vulcanized rubber composition which is obtained by vulcanization of the aforementioned rubber composition with an organic peroxide.

The present invention is described in detail below.

The component (A) of the present invention is an ethylene-(meth)acrylate copolymer rubber. The term (meth)acrylate herein means an acrylate and/or a methacrylate. The (meth)acrylate is preferably an ester comprising an alcohol having 1 to 8 carbon atoms and specifically includes methyl (meth)acrylate, n-butyl (meth)acrylate, tert-butyl (meth)acrylate, 2-ethylhexyl (meth)acrylate and the like. These esters may be used alone or in combination of the two or more.

The amount ratio (molar ratio) of ethylene and (meth)acrylate is in the range of 50:50 to 85:15, preferably 50:50 to 70:30. The amount of the (meth)acrylate means the total amount of an acrylate and a methacrylate. If the copolymer has an excessive amount of ethylene, crystallinity of the copolymer increases too much to often obtain the sufficient elasticity. On the other hand, if the copolymer has an excessive amount of the (meth)acrylate, an embrittlement point of the copolymer is so high that the copolymer is hardly used as an elastic rubber at low temperature.

The ethylene-(meth)acrylate copolymer rubber of the present invention includes, in addition to the above-described copolymer rubber comprising ethylene and a (meth)acrylate, a copolymer rubber comprising ethylene, a (meth)acrylate and an epoxy group-containing monomer. The epoxy group-containing monomer performs as a crosslinking point on vulcanization. The epoxy group-containing monomer includes, for example, unsaturated glycidyl esters such as glycidyl acrylate, glycidyl methacrylate, diglycidyl itaconate, glycidyl p-styrenecarboxylate and the like and unsaturated glycidyl ethers such as vinyl glycidyl ether, allyl glycidyl ether, and the like. The epoxy group-containing monomer is contained preferably in an amount of 8 molar % or less, more preferably 5 molar % or less. If the content of the monomer is too large, the copolymer rubber often degrades heat resistance and compression set. The use of an ethylene-(meth)acrylate copolymer rubber having a carboxyl group-containing monomer in place of the epoxy group-containing monomer gives poor compression set.

The (B) component of the present invention is an epichlorohydrin rubber which is vulcanizable with an organic peroxide and has unsaturated carbon-carbon double bonds as a vulcanizable group in the amount of 1 to 15 mole % in the rubber. Specifically it includes, an epichlorohydrin-allyl glycidyl ether copolymer, an epichlorohydrin-glycidyl acrylate copolymer, an epichlorohydrin-glycidyl methacrylate copolymer, an epichlorohydrin-butadiene monoxide copolymer, an epichlorohydrin-allyl glycidyl ether-ethylene oxide copolymer, an epichlorohydrin-glycidyl acrylate-ethylene oxide copolymer, an epichlorohydrin-glycidyl methacrylate-ethylene oxide copolymer, an epichlorohydrin-butadiene monoxide-ethylene oxide copolymer, an epichlorohydrin-allyl glycidyl ether-propylene oxide copolymer, an epichlorohydrin-glycidyl acrylate-propylene oxide copolymer, an epichlorohydrin-glycidyl methacrylate - propylene oxide copolymer and an epichlorohydrin-butadiene monoxide-propylene oxide copolymer. An amount of the vulcanizable group in the component (B) is 1 to 15 mole %, preferably 1 to 10 mole %. If the amount of the vulcanizable group is too small, co-valcanization of the component (B) with the component (A) proceeds insufficiently and the resulting vulcanized rubber composition is inferior in properties such as tensile strength. On the other hand, the amount of the vulcanizable group is too much, the vulcanized rubber composition has a high crosslinking density and thus an low elongation.

The ratio of the component (A) and the component (B) is in the range of 30 to 95 parts by weight, preferably 40 to 70 parts by weight of the component (A) and 70 to 5 parts by weight, preferably 60 to 30 parts by weight of the component (B). If the amount of the component (A) is too small, the composition is inferior in heat resistance and compression set. On the other hand, if the amount of the component (B) is too small, the composition has poor oil resistance.

The component (C) of the present invention is a multifunctional epoxy compound of a weight-average molecular weight in the range of 100 to 15,000 and of an epoxy equivalent in the range of 10 to 10,000 containing an epoxy ring. In this connection, a copolymer rubber containing ethylene, a (meth)acrylate and an epoxy group-containing monomer may be used as the component (A), as described above, while the component (C) of the present invention indicates a compound other than the copolymer rubber containing ethylene, a (meth)acrylate and an epoxy group-containing monomer. The weight-average molecular weight of the component (C) is 300 to 15,000, preferably 300 to 10,000. If the molecular weight is too small, bleed occurs after being cured. On the other hand, the molecular weight is too large, a softening point of the component (C) is so high that solid resin is left as it is while kneading of the components is made, until no good dispersion is obtained in compounding. The epoxy equivalent weight of the component (C) is 100 to 10,000, preferably 100 to 5,000. If the epoxy equivalent is too small, the rubber composition degrades heat resistance. On the other hand, the epoxy equivalent is too large, the rubber composition causes reversion and is inferior in mechanical properties. Preferable example of the component (C) is an epoxy resin obtained by a condensation reaction of bisphenol A and epichlorohydrin. The term "epoxy equivalent" means an amount of a resin in grams containing 1 g equivalent of an epoxy group. An amount of the component (C) used is in the range of 1 to 10 parts by weight, preferably 3 to 6 parts by weight per 100 parts by weight of the total amount of the components (A) and (B). If the amount of the component (C) is too small, the composition causes reversion and is inferior in mechanical properties. On the other hand, the amount of the component (C) is too large, the composition degrades heat resistance.

The rubber composition of the present invention is formed into a vulcanized rubber composition by the use of an organic peroxide as a crosslinking agent. The organic peroxide is organic peroxides usually used for crosslinking of rubber such as di-tert-butyl peroxide, tert-butylcumyl peroxide, dicumyl peroxide, α, α-bis(-tert-butylperoxyisopropyl)benzene, 2,5-di-methyl-2,5-di(tert-butylperoxy)hexane, 2,5-dimethyl-2,5-di(tert-butylperoxy)-hexyne-3, 1,1-bis(tert-butylperoxy)-3,3,5-trimethylcyclohexane, n-butyl-4,4-bis(tert-butylperoxy)valerate, 2,2-bis(tert-butylperoxy)butane and 2,2-bis(-tert-butylperoxy)octane.

An amount of the organic peroxide used is preferably in the range of 1 to 10 parts by weight, more preferably 2 to 6 parts by weight per 100 parts by weight of the total amount of the components (A) and (B). If the amount used is smaller than the lower limit of the above-described range, the vulcanized rubber composition has a low crosslinking density and thus an insufficient mechanical strength. On the other hand, if the amount used is more than the upper limit of the above-described range, the rubber composition may cause the problem of foaming undesirably during vulcanization and moulding.

In the present invention, well-known cross-linking aids such as p,p'-dibenzoylquinone dioxime, quinone dioxime, triallyl cyanurate, sulfur, ethylene dimethacrylate, N,N'-m-phenylenebismaleimide, triallyl isocyanurate, trimethylolpropane trimethacrylate or the like may be used in order to improve crosslinking efficiency during crosslinking with the organic peroxide.

The process for obtaining the rubber composition and the vulcanized rubber composition of the present invention is, for example, mixing the components (A) to (C) and the organic peroxide and, if necessary, well-known compounding agents such as anti-oxidants, vulcanization accelerators, processing aids, flowers of zinc, stearic acid, reinforcing agents, fillers, softening agents and the like in a conventional kneader such as a roll or a Banbury mixer to form vulcanizable rubber composition. The rubber composition is moulded into shapes according to objects and subjected to a vulcanization process to give a vulcanized rubber composition as a final product. The vulcanization is usually carried out at a temperature of 120° C. or higher, preferably from 150° to 220° C. for about 1 to 30 minutes. The present invention using an organic peroxide as a vulcanizing agent has an advantageous characteristic that secondary vulcanization is not necessary.

The vulcanized rubber composition of the present invention is used optimally for various applications for example, sealing materials such as gaskets, O-rings, packings or oil seals, hoses, belts, rolls or the like, taking advantage of its characteristics.

The present invention is described with reference to examples and comparative examples.

EXAMPLES 1–7 AND COMPARATIVE EXAMPLES 1–10

The rubber components and the compounding agents shown in Tables 1–2 are kneaded with a 6-inch open roll at 50° to 60° C. for 15 to 20 minutes to give a vulcanizable rubber composition. The vulcanizable rubber composition is subjected to press vulcanization at 170° C. for 20 minutes to give a vulcanized rubber composition. Properties of the vulcanized rubber composition thus obtained are measured in accordance with JIS-K-6301. The results are shown in Tables 3 and 4. In Comparative Example 8, no satisfactory vulcanized product is obtained due to reversion. In Comparative Example 10, no vulcanized product satisfactory in appearance and various physical properties is obtained due to excessively high valcanization rate.

The products obtained from Examples according to the present invention are satisfactory in all of the evaluation items. On the other hand, the products obtained from Comparative Examples 1 and 2 wherein no component (B) is used are inferior in oil resistance, and the product obtained from Comparative Example 3 exhibits inferior balance of oil resistance and low-temperature resistance. The products obtained from Comparative Examples 4–6 wherein component (A) is used are inferior in heat resistance and compression set. The product obtained from Comparative Example 7 wherein a copolymer containing a carboxyl group as a crosslinking point is used in place of the present (A) exhibits inferior compression set. In Comparative Example 8 wherein no the component (C) was used, no satisfactory vulcanized product is obtained due to reversion. The product obtained from Comparative Example 9 wherein the component (A) having epoxy group is used without the component (C) is inferior in compression set. In Comparative Example 10 wherein a crosslinking system comprising isocyanuric acid, octadecylammonium bromide, diphenylurea and Zisnet F (2,4,6-trimercapto-s-triazine, a crosslinking agent other than an organic peroxide) is used in place of the organic peroxide, no vulcanized product satisfactory in appearance and various physical properties is obtained due to excessively high vulcanization rate.

TABLE 1

| Formulation (part by weight) | Example | | | | | | |
|---|---|---|---|---|---|---|---|
| | 1 | 2 | 3 | 4 | 5 | 6 | 7 |
| Rubber component*1 | | | | | | | |
| Component (A) | | | | | | | |
| kind | A1 | A1 | A1 | A1 | A1 | A2 | A1 |
| amount | 70 | 50 | 30 | 50 | 50 | 50 | 50 |
| Component (B) | | | | | | | |
| kind | B1 | B1 | B1 | B2 | B3 | B2 | B1 |
| amount | 30 | 50 | 70 | 50 | 50 | 50 | 50 |
| Component (C) | | | | | | | |
| Epikote 838*2 | 5 | 5 | 5 | 5 | 5 | 5 | 5 |
| FEF Black | 40 | 40 | 40 | 40 | 40 | 40 | 40 |
| Stearic acid | 1 | 1 | 1 | 1 | 1 | 1 | 1 |
| Armine 18D*3 | 0.5 | 0.5 | 0.5 | 0.5 | 0.5 | 0.5 | 0.5 |
| Nocrack 224*4 | 1 | 1 | 1 | 1 | 1 | 1 | — |
| Antigene NBC*5 | 1 | 1 | 1 | 1 | 1 | 1 | — |
| Naugard*6 | 1 | 1 | 1 | 1 | 1 | 1 | 2 |
| DCPO*7 | 5 | 5 | 5 | 5 | 5 | 5 | 4 |
| Sumifain BM*8 | 0.5 | 0.5 | 0.5 | 0.5 | 0.5 | 0.5 | 0.3 |
| Isocyanuric acid | — | — | — | — | — | — | — |
| ODTMAB*9 | — | — | — | — | — | — | — |
| Diphenylurea | — | — | — | — | — | — | — |
| Magnesium oxide NS-200*10 | — | — | — | — | — | — | — |
| Zisnet F*11 | — | — | — | — | — | — | — |
| CML #21*12 | — | — | — | — | — | — | 3 |

TABLE 2

| Formulation (part by weight) | Comparative Example | | | | | | | | | |
|---|---|---|---|---|---|---|---|---|---|---|
| | 1 | 2 | 3 | 4 | 5 | 6 | 7 | 8 | 9 | 10 |
| Rubber component*1 | | | | | | | | | | |
| Component (A) | | | | | | | | | | |
| kind | A1 | A2 | A2 | — | — | — | — | A1 | A2 | A2 |
| amount | 100 | 100 | 50 | — | — | — | — | 50 | 50 | 50 |
| Component (B) | | | | | | | | | | |
| kind | — | — | — | B1 | B2 | B3 | B3 | B1 | B2 | B1 |
| amount | — | — | — | 100 | 100 | 100 | 50 | 50 | 50 | 50 |
| Others | | | | | | | | | | |
| kind | — | — | X1 | — | — | — | X2 | — | — | — |
| amount | — | — | 50 | — | — | — | 50 | — | — | — |
| Component (C) | | | | | | | | | | |
| Epikote 838*2 | 5 | 5 | — | 5 | 5 | 5 | 5 | — | — | — |
| FEF Black | 40 | 40 | 40 | 40 | 40 | 40 | 40 | 40 | 40 | 40 |
| Stearic acid | 1 | 1 | 1 | 1 | 1 | 1 | 1 | 1 | 1 | 1 |
| Armine 18D*3 | 0.5 | 0.5 | 0.3 | 0.5 | 0.5 | 0.5 | 0.5 | 0.5 | 0.5 | 0.3 |
| Nocrack 224*4 | 1 | 1 | — | 1 | 1 | 1 | 1 | 1 | 1 | — |
| Antigene NBC*5 | 1 | 1 | — | 1 | 1 | 1 | 1 | 1 | 1 | 1 |
| Naugard*6 | 1 | 1 | 2 | 1 | 1 | 1 | 1 | 1 | 1 | 2 |
| DCPO*7 | 5 | 5 | — | 5 | 5 | 5 | 5 | 5 | 5 | — |
| Sumifain BM*8 | 0.5 | 0.5 | — | 0.5 | 0.5 | 0.5 | 0.5 | 0.5 | 0.5 | — |
| Isocyanuric acid | — | — | 0.8 | — | — | — | — | — | — | 0.8 |
| ODTMAB*9 | — | — | 1.5 | — | — | — | — | — | — | 1.5 |
| Diphenylurea | — | — | 2.3 | — | — | — | — | — | — | 2.3 |
| Magnesium oxide NS-200*10 | — | — | — | — | — | — | — | — | — | 1.5 |
| Zisnet F*11 | — | — | — | — | — | — | — | — | — | 5 |
| | — | — | — | — | — | — | — | — | — | 0.9 |

TABLE 3

| Evaluation of vulcanized rubber compositions | Example | | | | | | |
|---|---|---|---|---|---|---|---|
| | 1 | 2 | 3 | 4 | 5 | 6 | 7 |
| Tensile properties | | | | | | | |
| Tesile strength (kgf/cm²) | 123 | 129 | 130 | 129 | 92 | 117 | 129 |
| Elongation (%) | 360 | 320 | 310 | 280 | 470 | 160 | 310 |
| Hardness (JIS-A) | 53 | 55 | 55 | 57 | 47 | 61 | 56 |
| Oil resistance*13 | | | | | | | |
| Volume swell (%) | 43 | 23 | 17 | 30 | 65 | 30 | 29 |
| Low-temperature resistance | | | | | | | |
| Embrittlement temperature (°C.) | −27 | −24 | −23 | −30 | −37 | −27 | −30 |
| Heat resistance*14 | | | | | | | |
| Tensile strength change | −24 | −44 | −65 | −41 | −64 | −15 | −16 |
| Elongation change (%) | 0 | −9 | −55 | −7 | −19 | −25 | −42 |
| Hardness change point | +14 | +8 | +15 | +4 | +8 | +8 | +14 |
| Compression set (%)*15 | 40 | 45 | 55 | 42 | 46 | 48 | 31 |

TABLE 4

| Evaluation of vulcanized rubber compositions | Comparative Example | | | | | | | |
|---|---|---|---|---|---|---|---|---|
| | 1 | 2 | 3 | 4 | 5 | 6 | 7 | 9 |
| Tensile properties | | | | | | | | |
| Tensile strength (kgf/cm²) | 103 | 111 | 120 | 133 | 126 | 75 | 89 | 130 |
| Elongation (%) | 600 | 500 | 480 | 320 | 210 | 410 | 390 | 200 |
| Hardness (JIS-A) | 50 | 49 | 59 | 56 | 60 | 43 | 50 | 59 |
| Oil resistance*13 | | | | | | | | |

TABLE 4-continued

Evaluation of vulcanized rubber compositions

| | Comparative Example | | | | | | | |
|---|---|---|---|---|---|---|---|---|
| | 1 | 2 | 3 | 4 | 5 | 6 | 7 | 9 |
| Volume swell (%) | 73 | 73 | 37 | 10 | 10 | 77 | 66 | 30 |
| Low-temperature resistance | | | | | | | | |
| Embrittlement temperature (°C.) | −32 | −32 | −24 | −21 | −29 | −44 | −37 | −27 |
| Heat resistance*14 | | | | | | | | |
| Tensile strength change | +8 | +42 | +19 | −88 | −81 | NM*16 | −19 | −25 |
| Elongation change (%) | −10 | −66 | −56 | −34 | −48 | NM*16 | −69 | −40 |
| Hardness change point | +22 | +30 | +13 | −4 | −3 | NM*16 | +16 | +10 |
| Compression set (%)*15 | 47 | 76 | 29 | 73 | 56 | 50 | 90 | 57 |

*1Rubber component
A1: Ethylene (67 molar %)-Methyl acrylate (33 molar %) copolymer rubber,
A2: Ethylene (67 molar %)-Methyl acrylate (32 molar %)-glycidyl methacrylate (1 molar %) copolymer rubber,
B1: Gechron 1100 (trade name), epichlorohydrin-allyl glycidyl ether copolymer rubber, having unsaturated carbon-carbon double bonds of 7 mole %, manufactured by Nippon Zeon,
B2: Gechron 3100 (trade name), epichlorohydrin-ethylene oxide-allyl glycidyl ether copolymer rubber, having unsaturated carbon-carbon double bonds of 8 mole %, manufactured by Nippon Zeon,
B3: Zeospan 303 (trade name), epichlorohydrin-propylene oxide-allyl glycidyl ether copolymer rubber manufactured by Nippon Zeon,
X1: AR31 (trade name), ethyl acrylate-glycidyl methacrylate copolymer, manufactured by Nippon Zeon,
X2: Vamac G (trade name), ethylene-methyl acrylate-monoethyl maleate copolymer rubber, manufactured by Du Pont,
*2Epikote 828: Compound having an epoxy ring (Epoxy resin obtained by condensation reaction of bisphenol A and epichlorohydrin); a weight-average molecular weight of 380; an epoxy equivalent: 184 to 194), manufactured by Showa-Shell Oil,
*3Armine 180: Processing aid, manufactured by Lion-Aquzo,
*4Nocrack 224: Anti-aging agent, manufactured by Ouchi-Shinkosha,
*5Antigene NBC: Anti-aging agent, manufactured by Sumitomo Chemical Co., Ltd.,
*6Naugard 445: Anti-aging agent, manufactured by Uniroyal,
*7DCPO: Dicumylperoxide 40% by weight, organic peroxide, manufactured by Sanken-Kako,
*8Sumifain BM, Crosslinking aid, manufactured by Sumitomo Chemical Co., Ltd.,
*9ODTMAB: Octadecyltrimethylammonium bromide,
*10NS-200: Anti-aging agent, manufactured by Nitto-Funka Kogyo,
*11Zisnet F: Crosslinking agent (2,4,6-trimercapto-s-triazine), manufactured by Nippon Zeon,
*12CML #21: Anti-aging agent (calcium oxide), manufactured by Ohmi Kagaku,
*13Oil resistance: JIS No. 3, oil, 150° C. × 70 hours,
*14Heat resistance: 175° C. × 3 days, Deterioration according to the Geer oven method,
*15Compression set: 150° C. × 70 hours,
*16NM: Unmeasurable due to the embrittlement by thermal deterioration.

As described above, a vulcanized rubber composition excellent in properties such as oil resistance, heat resistance, low-temperature resistance and compression set is provided.

What is claimed is:

1. A rubber composition comprising 30 to 95 parts by weight of the following component (a) and 70 to 5 parts by weight of the following component (B) and 1 to 10 parts by weight of the following component (C) per 100 parts by weight of the total amount of the components (A) and (B), wherein component (A) and component (B) total 100 parts by weight:
   component (A) is (1) an ethylene-acrylate or ethylenemethacrylate copolymer rubber, (2) ethylene-acrylate-unsaturated glycidyl ester copolymer rubber or ethylene-methacrylate-unsaturated glycidyl ester copolymer, or (3)ethylene-acrylate-unsaturated glycidyl ether or ethylene-methacrylate-unsaturated glycidyl ether copolymer, wherein the amount ratio in moles of ethylene and acrylate or methacrylate in (1), (2) and (3) is in the range from 50:50 to 85:15;
   component (B) is an epichlorohydrin rubber which is vulcanizable with an organic peroxide and has unsaturated carbon-carbon double bonds as a vulcanizable group in the amount of 1 to 15 mole % in the rubber; and
   component (C) is an epoxy resin obtained by condensation reaction of bisphenol A and epichlorohydrin, said epoxy resin having a weight-average molecular weight in the range of 100 to 15,000 and an epoxy equivalent weight in the range of 100 to 10,000 containing an epoxy ring.

2. A rubber composition according to claim 1, wherein said acrylate or methacrylate as the component (A) is an acrylate or methacrylate of an alcohol having 1 to 8 carbon atoms.

3. A rubber composition according to claim 1, wherein said acrylate or methacrylate in the component (A) is selected from the group consisting of methyl acrylate, methyl methacrylate, n-butyl acrylate, n-butyl methacrylate, tert-butyl acrylate, t-butyl methacrylate, 2-ethylhexyl acrylate and 2-ethyl hexyl methacrylate.

4. A rubber composition according to claim 1, wherein the amount ratio in mole of ethylene and an acrylate or methacrylate is in the range from 50:50 to 70:30.

5. A rubber composition according to claim 1, wherein said component (A) is an ethylene-acrylate-unsaturated glycidyl ester copolymer or an ethylene-methacrylate-unsaturated glycidyl ester copolymer.

6. A rubber composition according to claim 5, wherein said unsaturated glycidyl ester is selected from the group consisting of glycidyl acrylate, glycidyl methacrylate, diglycidyl itaconate, and glycidyl p-styrene-carboxylate.

7. A rubber composition according to claim 5, wherein the content of said unsaturated glycidyl ester in (2) or (3) of said component (A) is in the range of 8 mole % or smaller based on the total mole % of said component (A).

8. A rubber composition according to claim 5, wherein the content of said unsaturated glycidyl ester in (2) or (3) of said component (A) is in the range of 5 mole % or smaller based on the total mole % of said component (A).

9. A rubber composition according to claim 1, wherein said component (A) is an ethylene-acrylate-unsaturated glycidyl ether copolymer or an ethylene-methacrylate-unsaturated glycidyl ether copolymer.

10. A rubber composition according to claim 9, wherein said unsaturated glycidyl ether is selected from the group consisting of vinyl glycidyl ether, and allyl glycidyl ether.

11. A rubber composition according to claim 9, wherein the content of said unsaturated glycidyl ether in said component (A) is in the range of 8 mole % or smaller based on the total mole % of said component (A).

12. A rubber composition according to claim 9, wherein the content of said unsaturated glycidyl ether in said component (A) is in the range of 5 mole % or smaller based on the total mole % of said component (A).

13. A rubber composition according to claim 1, wherein the amount of the vulcanizable group in the component (B) is 1 to 10 mole %.

14. A rubber composition according to claim 1, wherein said component (B) is selected from the group consisting of an epichlorohydrin-allyl glycidyl ether copolymer, an epichlorohydrin-glycidyl acrylate copolymer, an epichlorohydrin-glycidyl methacrylate copolymer, an epichlorohydrin-butadiene monoxide copolymer, an epichlorohydrin-allyl glycidyl ether-ethylene oxide copolymer, an epichlorohydrin-glycidyl acrylate-ethylene oxide copolymer, an epichlorohydrin-glycidyl methacrylate-ethylene oxide copolymer, an epichlorohydrin-butadiene monoxide-ethylene oxide copolymer, an epichlorohydrin-allyl glycidyl ether-propylene oxide copolymer, an epichlorohydrin-glycidyl acrylate-propylene oxide copolymer, an epichlorohydrin-glycidyl methacrylate propylene oxide copolymer and an epichlorohydrin-butadiene monoxide-propylene oxide copolymer.

15. A rubber composition according to claim 1, wherein the ratio of the component (A) and the component (B) is in the range of 40 to 70 parts by weight to 60 to 30 parts by weight of the component (B).

16. A rubber composition according to claim 1, wherein the weight-average molecular weight of the component (C) is 200 to 10,000.

17. A rubber composition according to claim 1, wherein an epoxy equivalent weight of the component (C) is from 100 to 5,000.

18. A rubber composition according to claim 1, wherein the amount of the component (C) is in the range of 3 to 6 parts by weight per 100 parts by weight of the total amount of the components (A) and (B).

19. A vulcanized rubber composition obtained by vulcanizing the rubber composition according to claim 1 with an organic peroxide.

20. A vulcanized rubber composition according to claim 19 obtained by vulcanizing with 1 to 10 parts by weight of said organic peroxide per 100 parts by weight of the total amount of the components (A) and (B).

21. A vulcanized rubber composition according to claim 19 obtained by vulcanizing with 2 to 6 parts by weight of said organic peroxide per 100 parts by weight of the total amount of the components (A) and (B).

* * * * *